United States Patent [19]

Stanley

[11] Patent Number: 5,758,881
[45] Date of Patent: Jun. 2, 1998

[54] GAS PURGE LIP SEAL AND SEAL ASSEMBLY

[75] Inventor: Clive John Stanley, Twekesbury, England

[73] Assignee: Dowty Seals Limited, Tewkesbury, England

[21] Appl. No.: 769,771

[22] Filed: Dec. 19, 1996

[30] Foreign Application Priority Data

Dec. 21, 1995 [GB] United Kingdom ............... 9526171

[51] Int. Cl.$^6$ .................................... F16J 15/32
[52] U.S. Cl. ................... 277/552; 277/559; 277/560; 277/563
[58] Field of Search ................... 277/29, 35, 47, 277/63, 68, 69, 71, 72 R, 79, 134, 152

[56] References Cited

U.S. PATENT DOCUMENTS

| 2,133,487 | 10/1938 | Spargo | 277/68 |
| 2,149,147 | 8/1939 | Peterson et al. | |
| 3,008,781 | 11/1961 | Milster. | |
| 3,117,796 | 1/1964 | Liebig | 277/152 |
| 4,166,628 | 9/1979 | Blaydon | 277/162 |
| 4,497,496 | 2/1985 | Repella | 277/152 |
| 4,649,870 | 3/1987 | Hoelzer. | |
| 4,995,621 | 2/1991 | Devouassoux et al. | 277/152 |
| 5,556,112 | 9/1996 | Brandt. | |

FOREIGN PATENT DOCUMENTS

| 0 228 040B1 | 7/1987 | European Pat. Off. . | |
| 0 284 496 | 9/1988 | European Pat. Off. . | |
| 521226 | 1/1993 | European Pat. Off. | 277/152 |
| 246576 | 10/1988 | Japan | 277/152 |
| 312569 | 12/1988 | Japan | 277/152 |
| 613460 | 11/1948 | United Kingdom | 277/152 |
| 960 130 | 6/1964 | United Kingdom . | |
| 1457261 | 12/1976 | United Kingdom | 277/152 |
| 2193270 | 2/1988 | United Kingdom | 277/152 |
| 1 559 267 | 1/1990 | United Kingdom . | |
| 2258275 | 2/1993 | United Kingdom | 277/152 |
| 2 259 740 | 3/1993 | United Kingdom . | |
| 2 270 724 | 3/1994 | United Kingdom . | |

*Primary Examiner*—Scott Cummings
*Attorney, Agent, or Firm*—Marshall, O'Toole, Gerstein, Murray & Borun

[57] ABSTRACT

A shaft seal comprises a resilient sealing ring 1 with a peripheral sealing lip which is deflected axially in use so as to bear radially against a shaft. The sealing contact area 2 on the sealing lip is between predetermined limits, each defined by a change in angle of the surface of the sealing lip so that a substantial contact stress is maintained across the whole sealing contact area 2 in use. The seal can be used in an assembly including a carrier 5, 5' in which the seal is mounted. The seal can be used cooperatively with another shaft seal to prevent contaminants passing along the shaft.

8 Claims, 2 Drawing Sheets

GAS PURGE LIP SEAL AND SEAL ASSEMBLY

BACKGROUND OF THE INVENTION

This invention relates to shaft seals of the kind comprising a resilient sealing ring with a peripheral sealing lip which is deflected axially in use so as to bear radially against a sealing surface of the shaft or a housing member around the shaft.

Shaft seals are generally of a uniform thickness over their full radial width and when flexed against the sealing surface, they assume a regular curved shape so that the contact stress gradually falls to zero as the lip curves away from the shaft. There is therefore a substantially indeterminate sealing contact area and stress distribution which are both effected by wear of the lip and bell mouthing caused by the free end of the lip lifting away from the shaft.

Shaft seals may be used to seal against fluid flow along a shaft from a high pressure region to a low pressure region by arranging that the free end of the sealing lip extends towards the high pressure region and is loaded against the shaft by the fluid pressure. Alternatively, shaft seals can be used as fluid purge seals in which the free end of the sealing lip extends towards the low pressure region and acts to vent fluid from the high pressure region either in a continuous controlled manner or to vent excess pressure.

SUMMARY OF THE INVENTION

An object of the present invention is to provide an improved shaft seal of the aforesaid kind. This is achieved according to the invention by forming the sealing contact area on the sealing lip between predetermined limits, each limit being defined by a change of angle of the surface of the sealing lip so that a substantial contact stress is maintained across the whole of the sealing contact area in use.

Preferably, the sealing contact area is formed as a chamfered surface at the free end of the sealing lip, set at an acute angle to the general plane of the sealing ring.

Preferably, the sealing lip is formed by a thicker portion of the sealing ring to accommodate the chamfered contact area.

The invention also relates to a shaft seal assembly comprising a carrier in which is mounted a shaft seal, the shaft seal comprising a resilient sealing ring with a peripheral sealing lip which is deflected axially in use so as to bear radially against a sealing surface of a shaft or a housing member around the shaft, and forming the sealing contact area on the sealing lip between predetermined limits, each limit being defined by a change of angle of the surface of the sealing lip so that a substantial contact stress is maintained across the whole of the sealing contact area in use.

Furthermore, the invention relates to a shaft seal assembly comprising a carrier, a first shaft seal, and a second shaft seal, the first shaft seal comprising a resilient sealing ring with a peripheral sealing lip which is deflected axially in use so as to bear radially against a sealing surface of a shaft or a housing member around the shaft, and forming the sealing contact area on the sealing lip between predetermined limits, each limit being defined by a change of angle of the surface of the sealing lip so that a substantial contact stress is maintained across the whole of the sealing contact area in use, in which each shaft seal is mounted in the carrier so as to radially surround the shaft in use, the shaft seals being separated so as to define a region around the shaft.

The assembly advantageously reduces the risk of the undesirable movement of contaminants, such as other fluids or particles, passed each of the seals into said region, or even passed both of the seals and along the shaft.

Preferably, fluid is entered via an inlet into the region between the seals and passes out between at least one seal and the shaft or housing member so as to prevent ingress of contaminants into said region.

The seals are both preferably of polytetrafluoroethylene (PTFE). At least one, and preferably both seals, can be secured into corresponding grooves in the carrier by crimping.

BRIEF DESCRIPTION OF THE DRAWINGS

The invention is illustrated by way of example in the accompanying drawings, in which.

DETAILED DESCRIPTION OF PREFFERED EMBODIMENTS

The illustrated shaft seal comprises a PTFE ring 1 of a uniform thickness B, except at its inner periphery, where it is thicker to accommodate an annular chamfered sealing contact surface 2, set at an angle $\Theta$ to the general plane of the ring 1. This sealing contact surface 2 tapers towards the inner peripheral edge 3 of the ring 1, and has a predetermined width defined by its inner junction with the edge 3 and its outer junction with a ramp 4 at the change of thickness of the ring 1.

Figure 2:
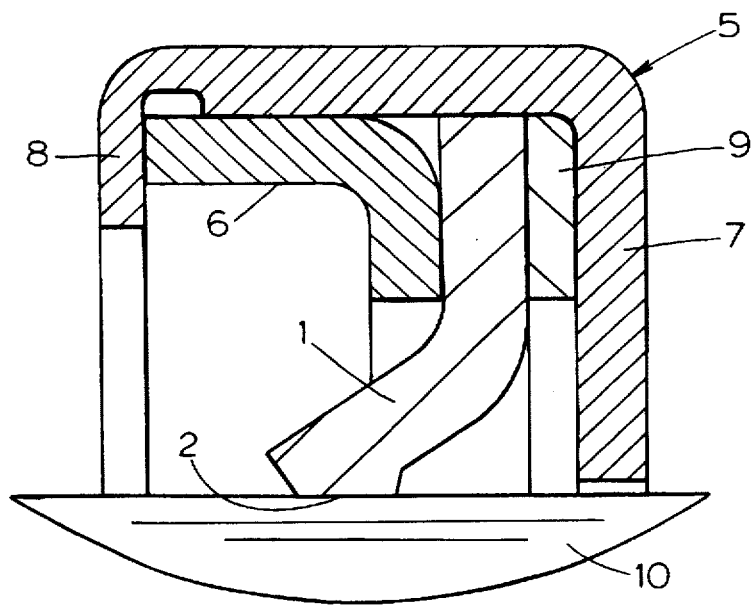
FIG. 2 is a section of a shaft seal assembly incorporating the seal of FIG. 1.

In use, as shown in FIG. 2, the outer periphery of the ring 1 is clamped in an outer annular carrier 5 between a clamp member 6 within the carrier 5 and a radial wall 7 of the carrier. An inwardly turned lip 8 of the carrier traps the clamp member 6 axially within the carrier, and a packing ring 9 is provided between the ring 1 and radial wall 7 of the carrier.

The assembled carrier 5 and ring 1 is inserted over a shaft 10 so that the shaft deflects the inner periphery of the ring 1, and the sealing contact surface 2 lies flush against the outer surface of the shaft.

Figure 3:
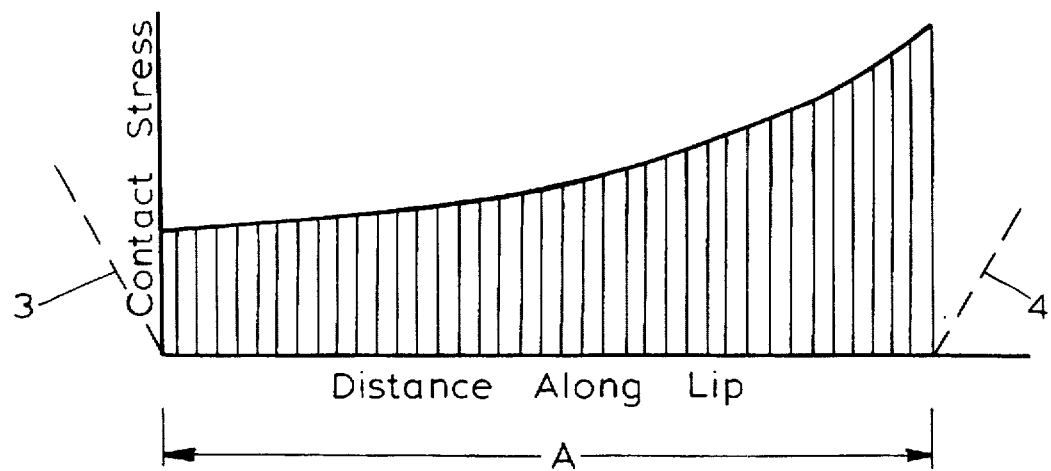
FIG. 3 is a graph showing the contact stress for the shaft seal in FIG. 2.

The contact stress across the sealing contact surface 2 between the lip 3 and ramp 4 is shown in FIG. 3. This demonstrates that there is a substantial contact stress across the whole width of the surface 2. The unit area contact stress is dependent upon the width A of the sealing contact area, and this can be increased as required. As a minimum, the width A might be 0.6 of the thickness B.

The contact stress can also be adjusted independently of width A by suitable choice of the other dimensions of the ring 1 such as angle $\Theta$ and thickness B. The contact stress is therefore a predictable design characteristic.

The contact stress is also dependent upon the resilience of the PTFE from which the ring 1 is made. This material is also preferably chemically stable and able to operate over a wide temperature range.

Also, the more uniform contact stress distribution compared with conventional resilient lip shaft seals allows better wear control, and the geometry of the sealing contact area 2 and its boundaries 3 and 4 serve to reduce the effect of wear on the overall geometry of the seal.

Figure 1:
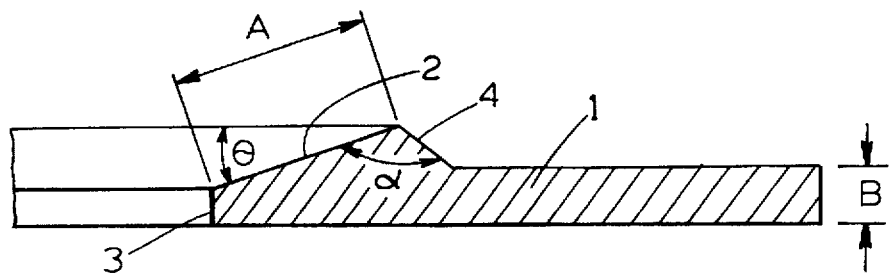
FIG. 1 is a part section of a shaft seal according to the invention.

In a typical embodiment of the invention, as shown in FIG. 1, the ratio of the width A to thickness B is 4:1 and the angle α between the sealing contact surface 2 and the ramp 4 is 120°. However, these parameters can be varied to suit the sealing application, the angle α being variable between 90° and 160°.

In the illustrated embodiment of the invention, the ring 1 is clamped in the carrier 5, but in an alternative embodiment, the ring 1 may be bonded to the carrier 5, for example, by adhesive bonding of adjacent radially extending faces of the ring 1 and carrier 5. In yet another alternative embodiment, the outer periphery of the ring 1 may engage a slot in the carrier 5 which is partially closed by crimping to grip the ring. In this last embodiment, care needs to be taken to ensure that the crimping action does not disturb the required orientation of the ring 1 relative to the carrier during assembly.

A shaft seal according to the invention is especially effective when used as a gas purge seal, the loading stress distribution being so as to control a restricted flow of gas past the sealing lip.

Figure 4:
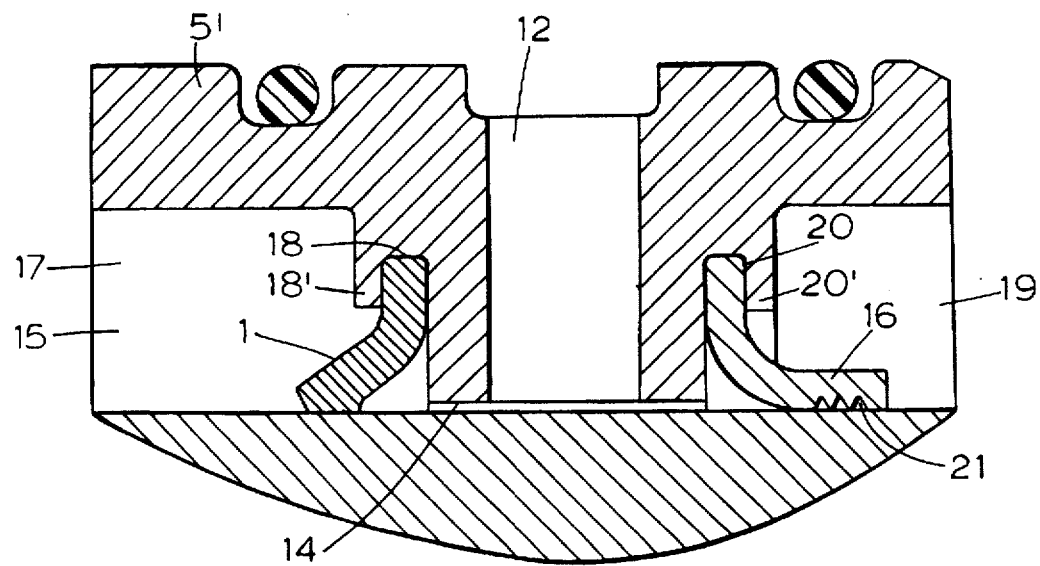
FIG. 4 is a section through another shaft seal assembly incorporating the shaft seal shown in FIG. 1.

Another shaft seal assembly including ring 1 is shown in FIG. 4. As shown in FIG. 4, this other shaft seal assembly has a carrier 5' has a throughbore 15 into which extends a tubular inlet 12 to a region 14 between ring 1 and a shaft seal 16. The shaft seal 16 is of known type. The shaft seal 16 of known type also cooperates with shaft 10' and has substantially uniform thickness over its radial width. When flexed against the sealing surface, the shaft seal 16 takes a regular curved shape in which contact stress gradually falls to zero as the seal curves away from the shaft 10. The shaft seal 16 incorporates a series of hydrodynamic grooves 21 to facilitate bending of the seal and provide a pumping action which assists in maintaining a properly pressurised seal. In another embodiment the shaft seal 16 does not incorporate hydrodynamic grooves.

The ring 1 and shaft seal 16 are made of PTFE but can be made of some other nonelastomeric material so as to be chemically stable and able to operate over a wide temperature range with good fluid resistance. As shown in FIG. 4, the ring 1 and shaft seal 16 are each preferably held in a corresponding groove 18, 20 in the carrier 5' by crimping a side wall 18', 20' of the respective groove so as to partially close it and hold the ring 1 or seal 16 in place. Crimping minimises the number of fluid leakage paths within the shaft seal assembly.

In a preferred use, the region 17 of the throughbore 15 on the side of the sealing ring 1 away from the central region 14 has toxic or corrosive fluid or particles within it. In order to prevent the fluid or particles ingressing into the central region 14 and possibly even from there into the far region 19 of the throughbore 15, gas is applied under pressure via the inlet 12. The gas is Nitrogen gas, but could be air or another gas which is at least relatively inert. There is a flow of this gas outwards from the central region 14 into region 17 between the shaft and sealing ring 1. This so-called "gas purge" prevents the undesirable ingress of fluid or particles in the opposite direction.

In the preferred embodiment, there is also gas purge passed seal 16, that is the gas flows from central region 14 into region 19 between the lip of seal 16 and the shaft surface. This also prevents ingress of contaminants such as fluid or particles, if any, from the region 19 into the central region 14. In other embodiments, this gas purge passed the seal 16 of known type does not occur.

By adjustment of the pressure of the gas passed in via inlet 12, the rate of gas purge passed one or both seals can be controlled so as to enable effective purging at various fluid pressures in the assembly, eg. in region 17 and possibly also region 19, and for various types of fluids or particles if any, in those regions 17, 19.

What is claimed is:

1. A shaft seal assembly comprising a carrier, a first shaft seal, and a second shaft seal, the first shaft seal comprising a resilient sealing ring with a peripheral sealing lip which is deflected axially in use so as to bear radially against a sealing surface of a shaft or a housing member around the shaft, and forming the sealing contact area on the sealing lip between predetermined limits, each limit being defined by a change of angle of the surface of the sealing lip so that a substantial contact stress is maintained across the whole of the sealing contact area in use, in which each shaft seal is mounted in the carrier so as to radially surround the shaft in use, the shaft seals being separated so as to define a region around the shaft in which the first shaft seal is oriented on the shaft whereby the free end of the sealing lip extends away from said region, and in which the second shaft seal has a sealing lip, the free end of which extends away from said region, at least one of the first shaft seal and the second shaft seal acting to vent fluid from said region either in a continuous controlled manner or to vent excess pressure.

2. A shaft seal assembly according to claim 1, in which the second seal is of substantially uniform shape and assumes as at least substantially regular curved shape in use so that contact stress substantially gradually falls to zero as the lip curves away from the shaft.

3. A shaft seal assembly according to claim 1, in which the second seal includes at least one hydrodynamic groove in its contact surface.

4. A shaft seal assembly according to claim 1, in which, in use, a fluid is introduced via an inlet into said region between the seals and passes out between at least one seal and the shaft or housing member so as to prevent ingress of contaminants between said at least one seal and the shaft or housing member into said region.

5. A shaft seal assembly according to claim 4, in which the pressure of introduced fluid is selected dependent on pressures in neighboring regions of the shaft bore so as to effect substantially continuous flow of the entered fluid past at least one seal.

6. A shaft seal assembly according to claim 1, in which both said first shaft seal and said second shaft seal are engaged in corresponding slots in the carrier, the slots being partially closed by crimping.

7. A shaft seal assembly according to claim 1, in which the sealing contact area is formed as a chamfered surface at the free end of the sealing lip, set at an acute angle to the general plane of the sealing ring.

8. A shaft seal assembly according to claim 1, in which the sealing lip is formed by a portion of the sealing ring thicker than the thickness of the rest of the sealing ring to accommodate the chamfered contact area.

* * * * *